UNITED STATES PATENT OFFICE.

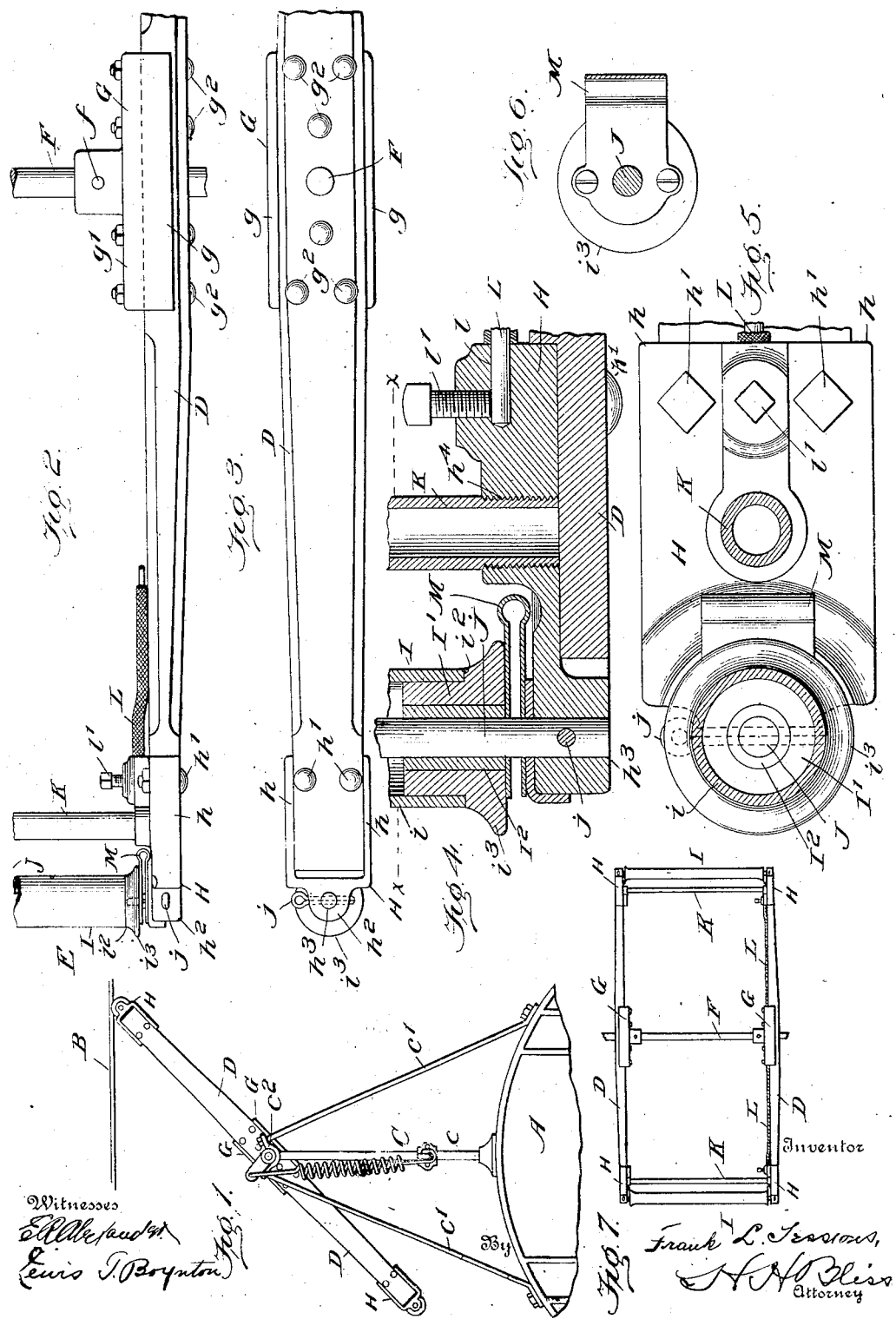

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

TROLLEY.

No. 895,806.

Specification of Letters Patent.

Patented Aug. 11, 1908.

Application filed May 24, 1904. Serial No. 209,583.

*To all whom it may concern:*

Be it known that I, FRANK L. SESSIONS, a citizen of the United States, residing at Columbus, in the county of Franklin and State of Ohio, have invented certain new and useful Improvements in Trolleys, of which the following is a specification, reference being had therein to the accompanying drawing.

This invention relates to improvements in trolleys or current collecting devices used with electric locomotives for receiving the current from the stationary conductor and transmitting it to the apparatus to be actuated thereby.

It pertains more particularly to trolley devices of the class in which each collector is made in two parts adapted to be alternately used, these two parts being mounted upon a common axis and extending in opposite directions therefrom, so that the collector as a whole can be reversed to first bring one end into active position and then the other.

Figure 1 is a side view of part of an electric locomotive having a trolley device attached thereto embodying my improvements. Fig. 2 is a view of part of one of the side arms on a larger scale, it showing also part of the mounting or supporting parts and a part of the contact device. Fig. 3 is a face view of the parts shown in Fig. 2. Fig. 4 is a sectional view of the parts at the outer end of one of the arms. Fig. 5 is a sectional view on the line X—X of Fig. 4. Fig. 6 shows the collecting spring in section. Fig. 7 is an end view showing the collector complete.

In the drawings, A indicates an electrically driven car. This may be of any approved form and be provided with a motor and other apparatus of any desired sort.

While the parts that more particularly embody the invention, or improvements to which this patent pertains are intended especially for use in connection with relatively small electric locomotives of the sort employed in factory yards, freight house track ways, in mine haulage and the like, it will be understood that the invention is not to be limited in that respect.

B indicates a section of the main conductor system, principally composed of wires suspended overhead and from which it is desired to conduct the current for operating the motors on the car A.

C—C are uprights or frame sections which are secured to and extend up from the top of the locomotive and are intended to carry the collector to be described. As shown there is a frame section at each side of the car, which is composed of a central standard $c$, two inclined braces $c^1$ secured at suitable points to the car, and also at their upper ends to the bearing $c^2$.

The collector, proper, is composed of the carrying arms D, the collecting devices at E and the hinging or supporting devices at F.

Each of the side bars D is made of wood of suitable sort, so as to serve to insulate the current conducting parts and also serve as supports therefor. Each bar is at its center, longitudinally, secured to a mounting block G, provided with a socket or formed with flanges $g$ which, together with the back plate $g^1$, firmly hold the wooden bar D in place when fastened by the bolts at $g^2$. The shaft or hinged bar F passes through these mounting blocks G and is rigidly connected thereto by a pin or bolt as at $f$.

The shaft F at each end projects somewhat beyond the side bars D and the projecting part is mounted in the bearing at $c^2$ above described.

The bars D—D extend outward from their axis on substantially parallel lines and at their outer ends are each provided with a metallic attachment indicated as a whole by H. This is socketed or formed with flanges at $h$, the flanges lying by the side of the bar D and the latter being fastened by bolts or rivets as shown at $h^1$. The metallic attachment is formed with a bearing at $h^2$, which is provided with an aperture at $h^3$. At $h^4$ it has a threaded aperture.

I indicates the collecting roller as a whole. It is formed of a section of tubing $i$ which extends from points near one of the bars D across to points near the other, this tube in practice being from two to three feet long, though it may be shorter or longer as occasion may require. At each end of the tube there is a metallic plug or filling piece I', which is so shaped as to have a short tube or sleeve fitting tightly within the end part of the tube I, and shouldered at $i^2$ and a tapering head part $i^3$.

At $I^2$ there is a bushing fitted in the filling block I'.

The roller is mounted at each end on shaft J which extends through and projects beyond the ends thereof. This shaft at either end is seated in the aperture $h^3$ in the metallic attachment H and is fastened therein by a pin $j$ or otherwise. The inner end of the pin $j$ is fitted in the bushing $I^2$ and provides a support upon which the tube can rotate.

The outer ends of the side bars D—D are connected together by a brace K, which is preferably a section of tubing screw threaded and fitted in the apertures at $h^4$. This cross tube together with the insulating arms D—D form a strong rectangular frame. One of the metallic attachments H is provided with a binding post, or is otherwise adapted to have the conductor wires secured thereto. As shown, an aperture at $l$ is formed to receive the end of the wire L and a transversely arranged bolt $l^1$ is employed to fasten the wire in place. The wire extends along the insulating bar D to the axis and is then carried down or is connected with the conductor sections which extend down to the motor. An electric path is provided from the roller I to the wire L through the pin J and the metallic attachment H. To prevent breaking this part of the circuit, use is made of flat bent springs, as shown at M, having perforations through which the pin J passes and being so shaped as that one end shall tend to press outward toward the attachment H and the other to press inward toward the end of the roller I.

Trolleys of this sort, generally known as teetering trolleys, are now well known; but I believe myself to have succeeded in devising one embodying several matters of advantage and superiority in comparison with those that have heretofore been known. The wooden bars D are superior to the metallic bars that have been heretofore employed in teetering trolleys, as they not only furnish the requisite strength but are resilient and moreover can be so arranged as to provide perfect insulation, so that there shall be no loss of current under ordinary circumstances and again they permit their being grasped by the hand in case of sudden necessity without harm to the party touching them. The cross brace tubes at K insure a rigidity in the framework and prevent torsional twisting of the bars D, and also prevent them from becoming misplaced by slipping around their hinge axis. The metallic attachment blocks H not only provide a firm mounting for the roller and the cross brace but also an electric connection between the roller and the insulated wire.

What I claim is

1. In a current collecting trolley mechanism of the character described, the combination of the two wooden insulating and supporting arms D, the hinging devices for supporting said arms, the elongated tubular collecting roller E extending from points near one arm to points near the other, the mounting blocks at the outer ends of the wooden arms for supporting the rollers, and the cross brace K rigidly connected to the said mounting blocks, substantially as set forth.

2. In a current collecting trolley mechanism of the character described, the combination of the wooden insulating and bracing bars D, the hinging devices therefor, the elongated tubular collecting device extending from points near one arm D to points near the other, the expanded bushing heads inserted into the said tubular collector, the metallic mounting blocks secured to the outer ends of the bars D, the journals interposed between the mounting blocks and the roller bushings, and the cross brace K rigidly secured to the mounting blocks, substantially as set forth.

3. In a current collecting trolley mechanism of the class described, the combination of the wooden insulating and supporting bars D, the mounting blocks secured to the outer ends of the bars, the elongated collecting roller, the solid bushing heads in the collecting roller, the wearing bushing, the journal carried by the mounting block, the conductor extending along the insulating bars D and electrically connected to the mounting block, substantially as set forth.

In testimony whereof I affix my signature in presence of two witnesses.

FRANK L. SESSIONS.

Witnesses:
C. E. WAXBORN,
R. R. DUNLOP.